United States Patent [19]
Oh

[11] Patent Number: 5,629,935
[45] Date of Patent: May 13, 1997

[54] SIGNAL MULTIPLEXING APPARATUS USING MULTICONNECTION

[75] Inventor: Yun S. Oh, Seoul, Rep. of Korea

[73] Assignee: Korea Telecommunication Authority, Rep. of Korea

[21] Appl. No.: 502,545

[22] Filed: Jul. 14, 1995

[30] Foreign Application Priority Data

Jul. 14, 1994 [KR] Rep. of Korea ............ 94-16956

[51] Int. Cl.$^6$ .................................... H04L 12/64
[52] U.S. Cl. .................. 370/471; 370/536; 370/538
[58] Field of Search ................. 370/60, 60.1, 79, 370/82, 94.1, 94.2, 99, 105.1

[56] References Cited

U.S. PATENT DOCUMENTS 5,446,726  8/1995  Rostoker et al. ............ 370/17
5,526,349  6/1996  Diaz et al. ................... 370/79

*Primary Examiner*—Melvin Marcelo
*Attorney, Agent, or Firm*—Merchant, Gould, Smith, Edell, Welter & Schmidt

[57] ABSTRACT

A signal multiplexing apparatus using multiconnection, comprising an input signal interface circuit for inputting a DS1 (or DS1E) signal, a video signal and an ATM cell signal, an input signal processing multiport RAM having a plurality of ports for receiving data from the input signal interface circuit, an input signal control circuit for controlling the input signal processing multiport RAM, and an output signal address generation/multiplexing circuit connected to the input signal processing multiport RAM. The output signal address generation/multiplexing circuit reads data from the input signal processing multiport RAM and multiplexes the read data into a desired format. The signal multiplexing apparatus further comprises a multiconnection multiport RAM for performing an interface operation between the output signal address generation/multiplexing circuit and the input signal control circuit, and a testing/central processing unit connected to the input signal processing multiport RAM, for performing a test function and a system management function.

16 Claims, 9 Drawing Sheets

5,629,935

SIGNAL MULTIPLEXING APPARATUS USING MULTICONNECTION

BACKGROUND OF THE INVENTION

1. Field of the Invention

The present invention relates in general to a signal multiplexing apparatus for inputting signals with recognizable frame formats and characteristics, such as DS1, DS1E and ATM cell signals generated from exchanges or other transfer equipment, and multiplexing the inputted signals into a desired format, and more particularly to a signal multiplexing apparatus using multiconnection which is capable of storing the inputted signals into memory buffers, arranging the stored signals according to the desired format, sequentially writing address data corresponding to memory locations, in which the inputted signals and overhead are stored, into address storage memory locations on the basis of the desired format and sequentially reading the address storage memory locations to multiplex the inputted signals into the desired format.

2. Description of the Prior Art

Generally, a signal multiplexing apparatus has been proposed to input signals from exchanges or other transfer equipment and multiplex the inputted signals. The signal multiplexing apparatus is adapted to sequentially multiplex low-speed signals inputted therein to covert them into high-speed signals. This is accomplished on the assumption that signals of the same speed are multiplexed in various multiplexing steps.

In the case where input signals have different characteristics (for example, the relation between DS1 and DS1E signals or the relation between those signals and a video signal) or frames of the input signals are not synchronized with a system frame synchronous signal as shown in FIG. 1 although the input signals have the same characteristic, it is hard to multiplex the input signals into a desired format. For this reason the input signals are sequentially connected and multiplexed in the order of input signal 1, input signal 2, . . . , input signal n, input signal 1, input signal 2, . . . , as shown in FIG. 2. It is also required to insert an unnecessary stuffing bit during the multiplexing operation. Also, even when input signals with the same characteristic, synchronized with the system frame synchronous signal as shown in FIG. 3, are to be processed, it is difficult to change positions of time slots in the input signals. Further, a difficulty is present in multiplexing input signals with different formats as shown in FIG. 4, such as audio and video signals, into a desired format.

SUMMARY OF THE INVENTION

Therefore, the present invention has been made in view of the above problems, and it is an object of the present invention to provide a signal multiplexing apparatus using multiconnection which is capable of multiplexing signals with different formats and characteristics or asynchronous signals into a desired format and exchanging time slots in the signals with one another.

In accordance with the present invention, the above and other objects can be accomplished by the provision of a signal multiplexing apparatus using multiconnection. In accordance with an embodiment of the present invention, the signal multiplexing apparatus using multiconnection comprises input signal interface means for inputting a DS1 (or DS1E) signal, a video signal and an ATM cell signal; input signal processing multiport memory means having a plurality of ports for receiving data from the input signal interface means; input signal control means for controlling the input signal processing multiport memory means; output signal address generation/multiplexing means connected to the input signal processing multiport memory means, the output signal address generation/multiplexing means reading data from the input signal processing multiport memory means and multiplexing the read data into a desired format; multiconnection multiport memory means for performing an interface operation between the output signal address generation/multiplexing means and the input signal control means; and testing/central processing means connected to the input signal processing multiport memory means, for performing a test function and a system management function.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
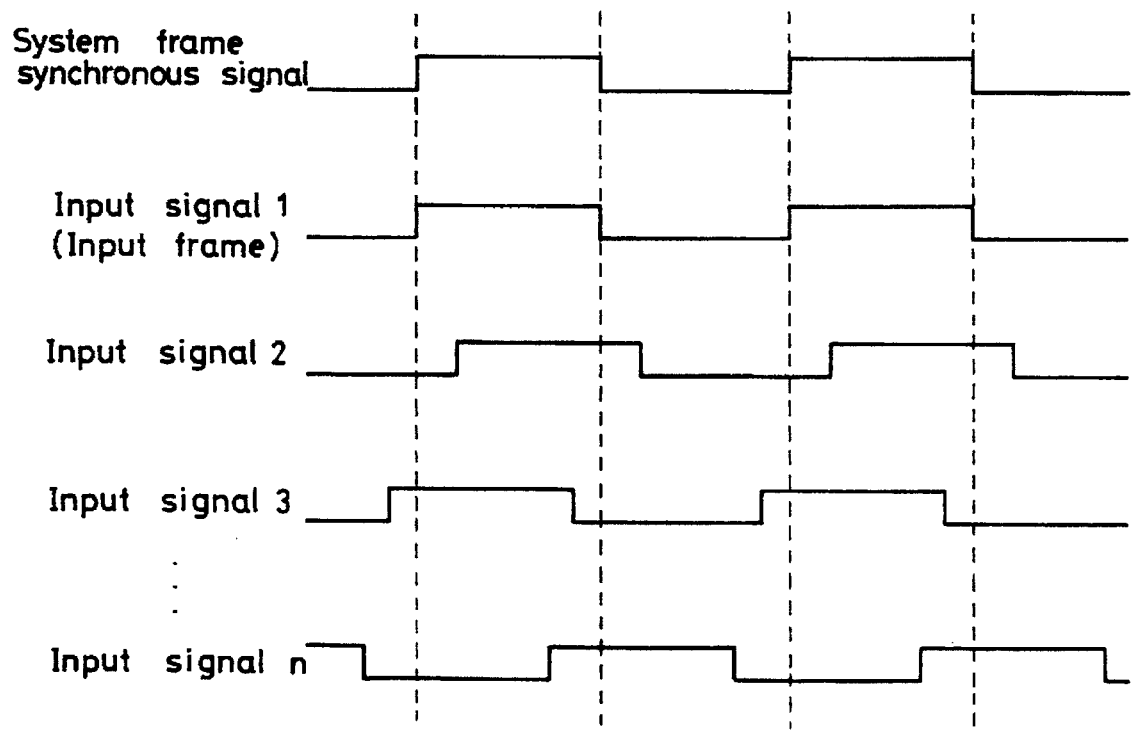
FIG. 1 is a timing diagram of input signals which have the same characteristic, but are not synchronized with a system frame synchronous signal.
Figure 2:
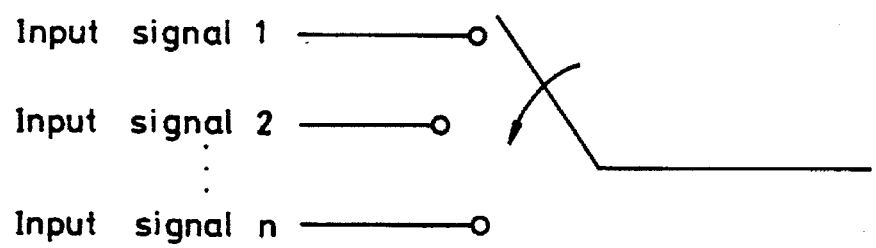
FIG. 2 is a view schematically illustrating the operation of a conventional signal multiplexing apparatus for multiplexing the input signals in FIG. 1.
Figure 3:
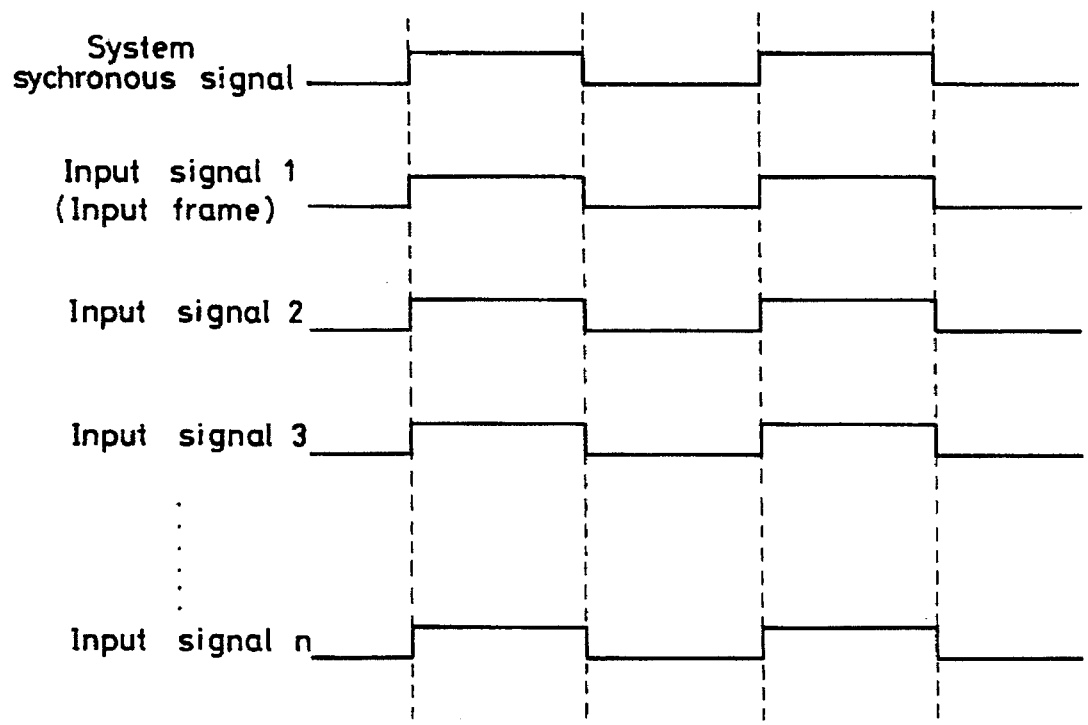
FIG. 3 is a timing diagram of input signals which have the same characteristic and are synchronized with the system frame synchronous signal.
Figure 4:
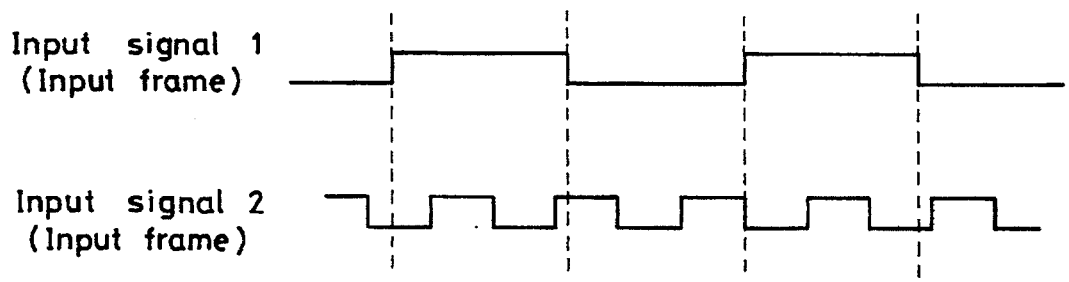
FIG. 4 is a timing diagram of input signals having different formats.
Figure 5:
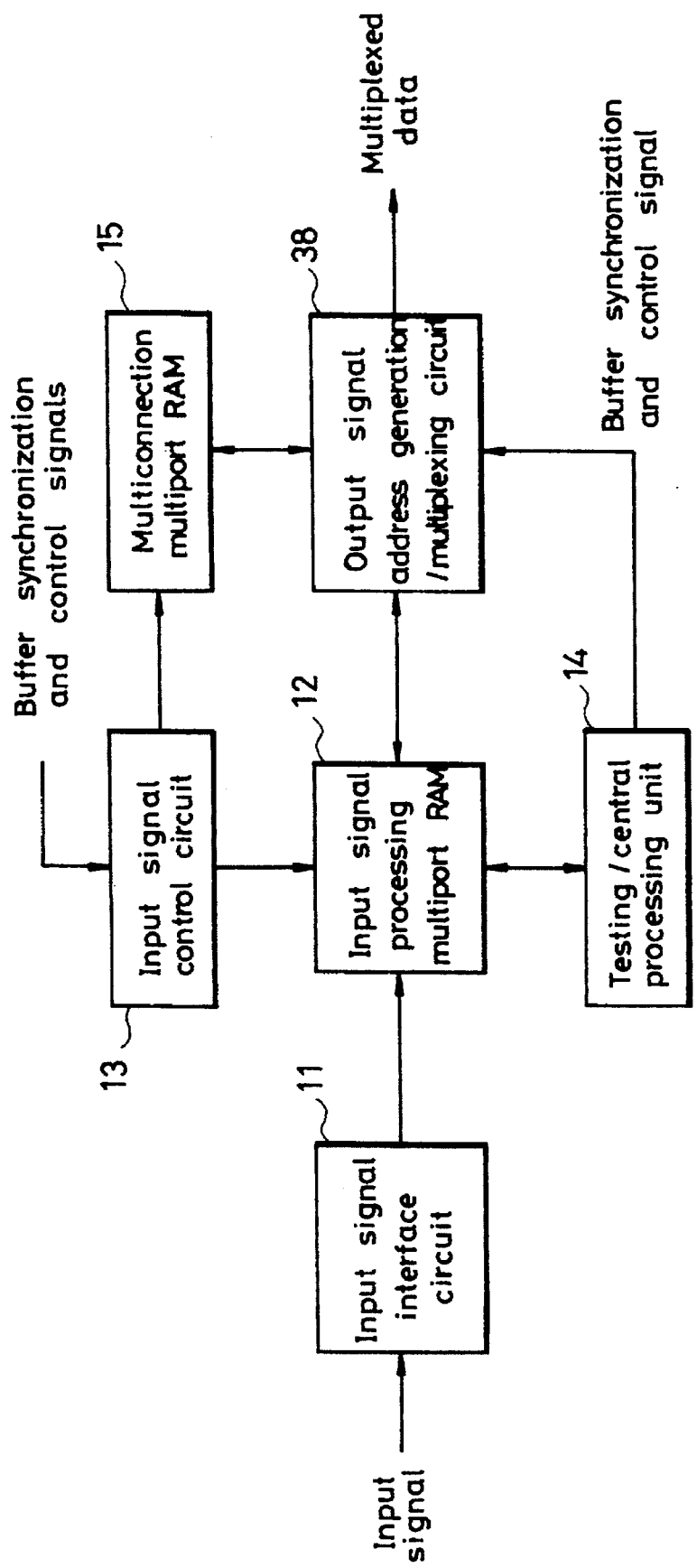
FIG. 5 is a block diagram of a signal multiplexing apparatus in accordance with an embodiment of the present invention.

Referring to FIG. 5, there is shown a block diagram of a signal multiplexing apparatus in accordance with an embodiment of the present invention. As shown in this drawing, the signal multiplexing apparatus comprises an input signal interface circuit 11 for inputting a DS1 (or DS1E) signal, a video signal and an ATM cell signal, an input signal processing multiport random access memory (referred to hereinafter as RAM) 12 having a plurality of ports for receiving data from the input signal interface circuit 11, an input signal control circuit 13 for controlling the input signal processing multiport RAM 12, and an output signal address generation/multiplexing circuit 38 connected to the input signal processing multiport RAM 12. The output signal address generation/multiplexing circuit 38 is adapted to read data from the input signal processing multiport RAM 12 and multiplex the read data into a desired format.

The signal multiplexing apparatus further comprises a multiconnection multiport RAM 15 for performing an interface operation between the output signal address generation/multiplexing circuit 38 and the input signal control circuit 13, and a testing/central processing unit 14 connected to the input signal processing multiport RAM 12, for performing a test function and a system management function.

Figure 6:
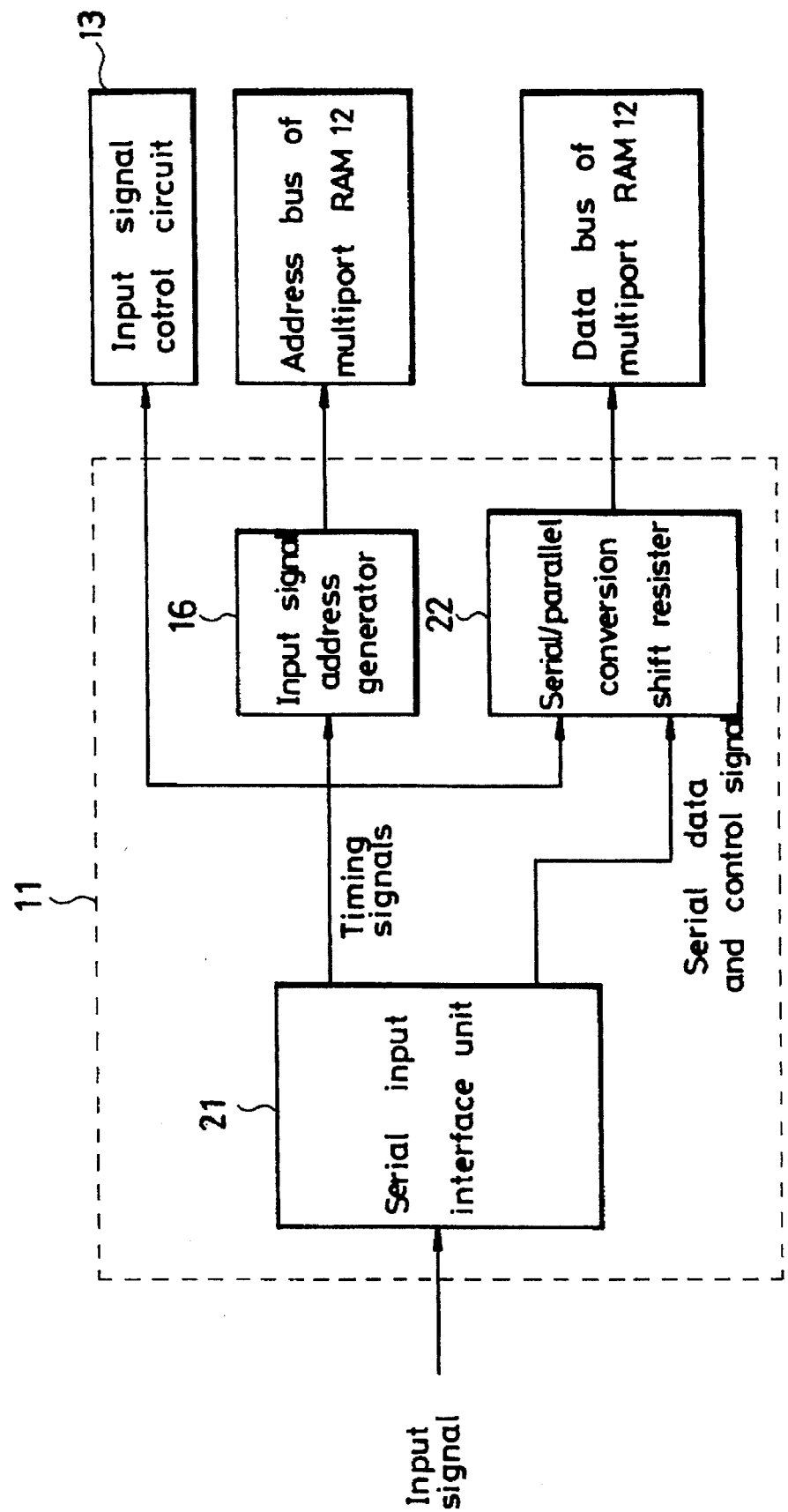
FIG. 6 is a detailed block diagram of an input signal interface circuit in FIG. 5.

Referring to FIG. 6, there is shown a detailed block diagram of the input signal interface circuit 11 in FIG. 5. As shown in this drawing, the input signal interface circuit 11 includes a serial input interface unit 21, an input signal address generator 16, and a serial/parallel conversion shift register 22.

The serial input interface unit 21 is adapted to input the DS1 (or DS1E) signal, the video signal and the ATM cell signal from exchanges or other transfer equipment in a serial data format. The serial input interface unit 21 transfers serial data and a control signal to the serial/parallel conversion shift register 22. In response to the control signal from the serial input interface unit 21, the serial/parallel conversion shift register 22 converts the serial data from the serial input interface unit 21 into parallel data and supplies the converted parallel data in the unit of byte to a data bus of the input signal processing multiport RAM 12. The serial input interface unit 21 also generates timing signals including a clock signal, a data synchronous signal and a frame synchronous signal and applies the generated timing signals to the input signal address generator 16. The input signal address generator 16 generates addresses in response to the timing signals from the serial input interface unit 21 and applies the generated addresses to an address bus of the input signal processing multiport RAM 12. As a result, the parallel data from the serial/parallel conversion shift register 22 are stored in the unit of byte into locations of the input signal processing multiport RAM 12 corresponding to the addresses from the input signal address generator 16. The timing signals from the serial input interface unit 21 are also applied to the input signal control circuit 13 and the serial/parallel conversion shift register 22 to control timing thereof.

Figure 7:
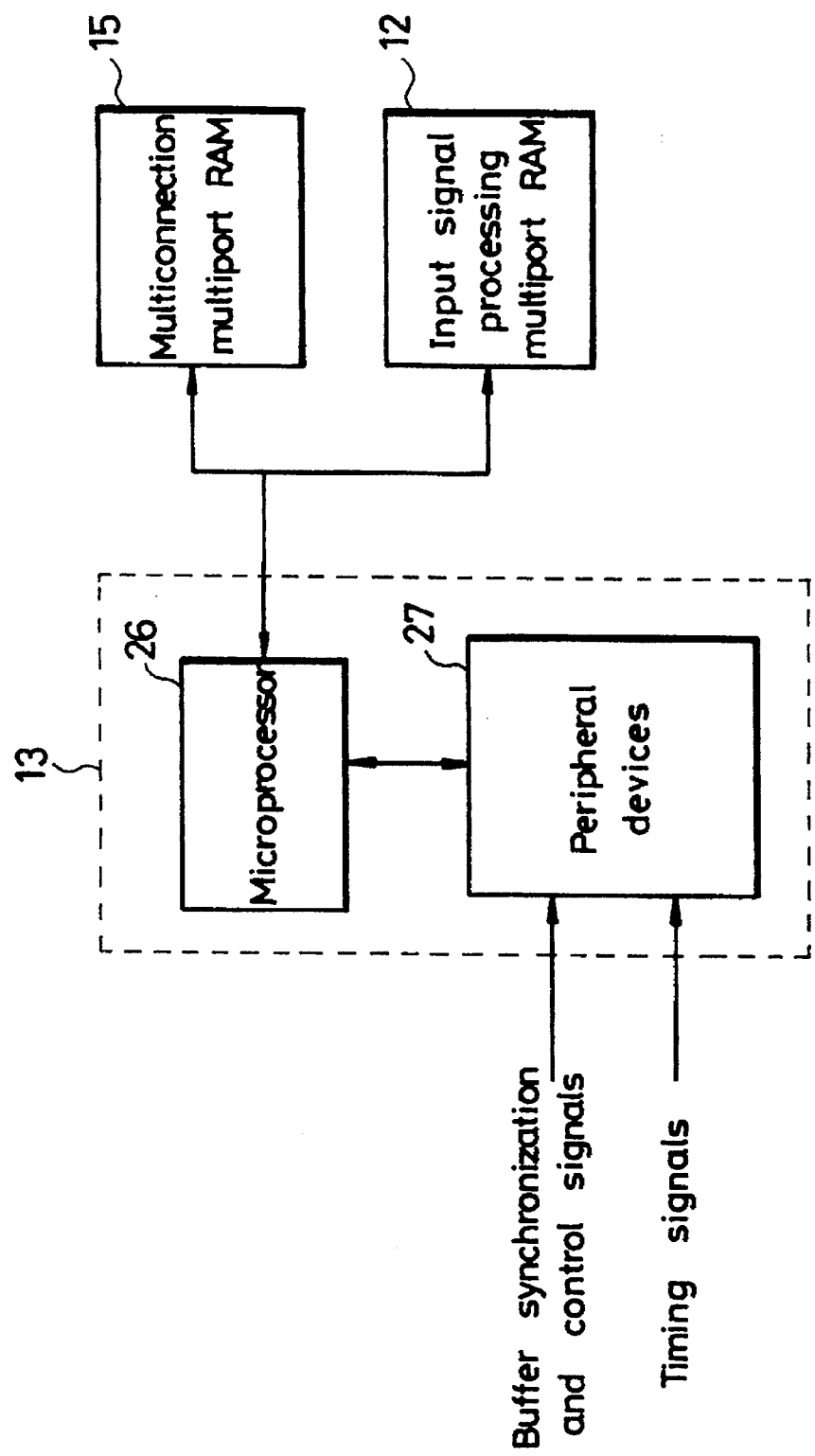
FIG. 7 is a detailed block diagram of an input signal control circuit in FIG. 5.

Referring to FIG. 7, there is shown a detailed block diagram of the input signal control circuit 13 in FIG. 5. The input signal control circuit 13 acts to control the input signal processing multiport RAM 12. As shown in FIG. 7, the input signal control circuit 13 is provided with a microcomputer system which comprises a microprocessor 26 and peripheral devices 27. The peripheral devices 27 may include memories such as a read only memory (ROM) and a RAM, a timer and an interrupt control circuit. With this construction, the input signal control circuit 13 performs a particular control operation in response to the timing signals from the serial input interface unit 21 and buffer synchronization and control signals from the testing/central processing unit 14. Also, the input signal control circuit 13 stores address data corresponding to locations of the input signal processing multiport RAM 12 into the multiconnection multiport RAM 15, so as to analyze data stored in desired ones of the locations of the input signal processing multiport RAM 12 and multiplex the analyzed data into the desired format.

Figure 8:
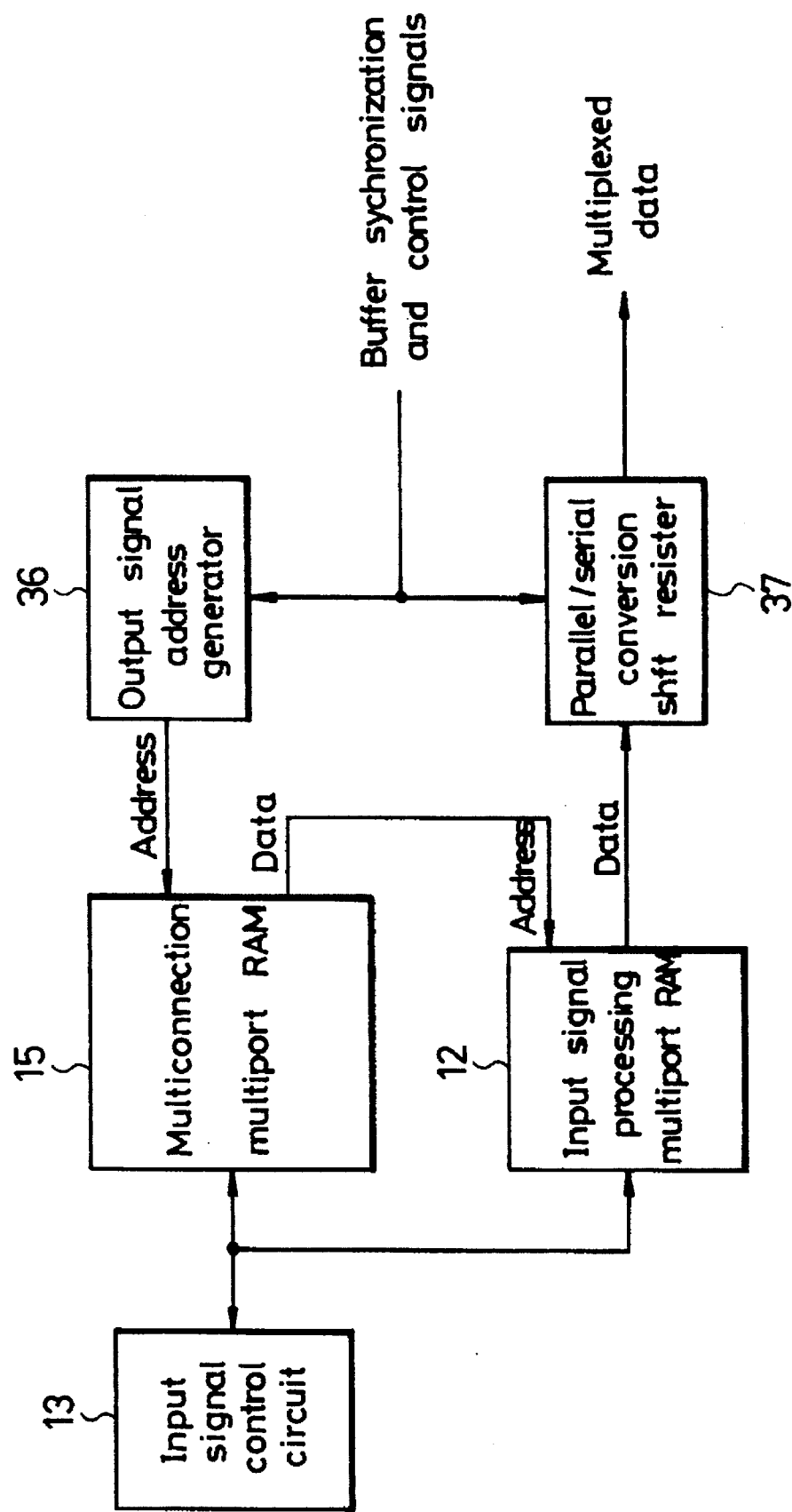
FIG. 8 is a detailed block diagram of an output signal address generation/multiplexing circuit in FIG. 5.

Referring to FIG. 8, there is shown a detailed block diagram of the output signal address generation/multiplexing circuit 38 in FIG. 5. As shown in this drawing, the output signal address generation/multiplexing circuit 38 includes an output signal address generator 36 ad a parallel/serial conversion shift register 37. The output signal address generator 36 may include a counter. The output signal address generator 36 generates addresses in response to the buffer synchronization and control signals from the testing/central processing unit 14 and applies the generated addresses to the multiconnection multiport RAM 15. The multiconnection multiport RAM 15 outputs address data stored in its locations corresponding to the addresses from the output signal address generator 36 to the input signal processing multiport RAM 12. As a result, the input signal processing multiport RAM 12 outputs parallel data stored in its locations corresponding to the address data from the multiconnection multiport RAM 15 to the parallel/serial conversion shift register 37. In response to the buffer synchronization and control signals from the testing/central processing unit 14, the parallel/serial conversion shift register 37 converts the parallel data from the input signal processing multiport RAM 12 into serial data and multiplexes the converted serial data.

Figure 9:
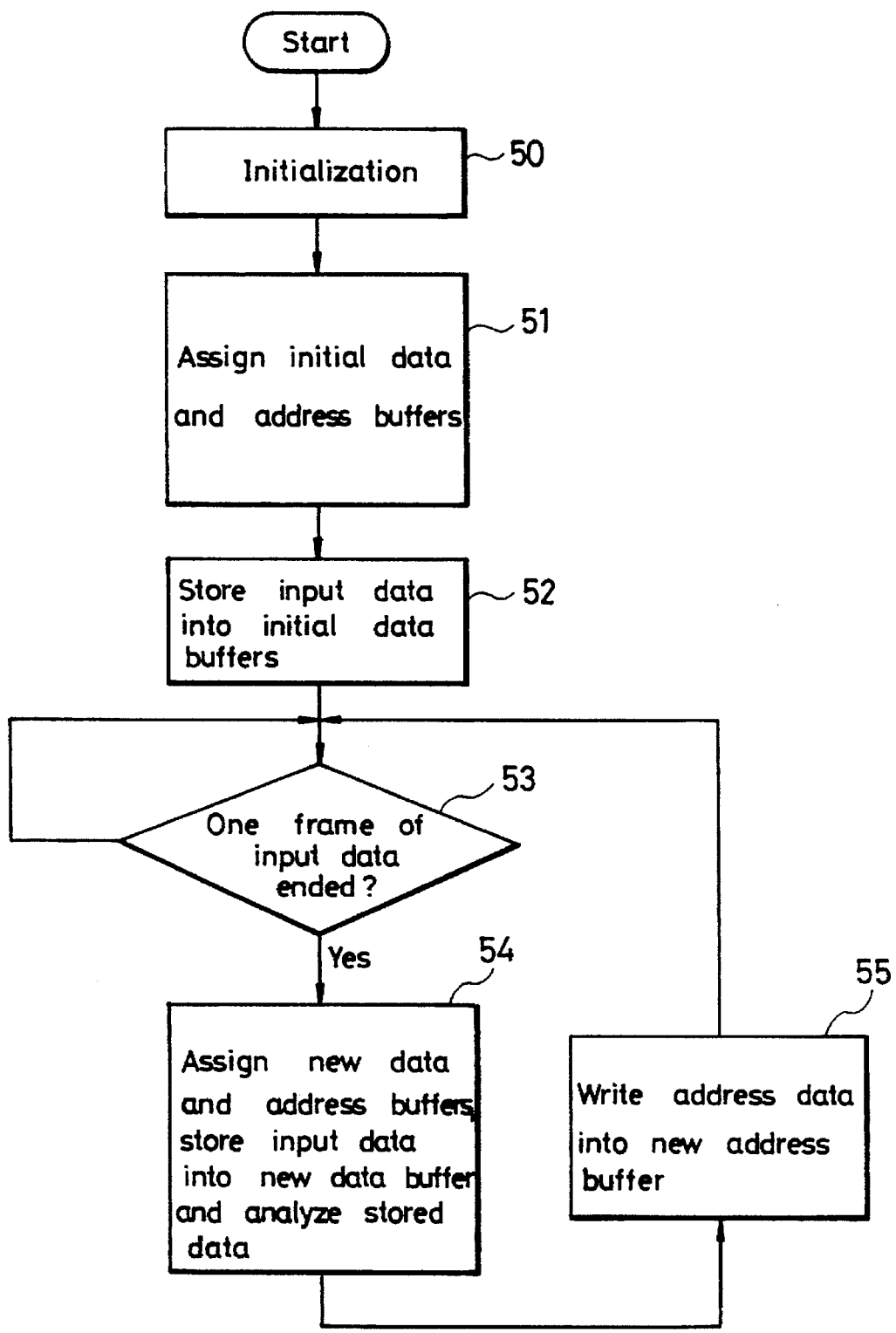
FIG. 9 is a flowchart illustrating the operation of the input signal control circuit in FIGS. 5 and 7 in accordance with the embodiment of the present invention.

Referring to FIG. 9, there is shown a flowchart illustrating the operation of the input signal control circuit 13 which analyzes the data from the input signal interface circuit 11 stored into the input signal processing multiport RAM 12 and stores the address data into the multiconnection multiport RAM 15 in accordance with the analyzed result. First, at the step 50, the input signal control circuit 13 is initialized. Namely, the microprocessor 26 in the input signal control circuit 13 initializes the microcomputer system. At the step 51, the input signal processing multiport RAM 12 and the multiconnection multiport RAM 15 are initialized for the multiplexing of the input data into the desired format. At this time, an initial data buffer and an initial address buffer are assigned in response to buffer initialization and synchronization signals. The input data is stored into the initial data buffer at the step 52. Then, the data analyzing and address buffer assigning steps are repeatedly performed. It is checked at the step 53 whether one frame of the input data has been ended. If it is checked at the step 53 that one frame of the input data has been ended, a new data buffer and a new address buffer are assigned and the input data is stored into the new data buffer at the step 54. The input data stored in the new data buffer is then analyzed at the step 54. At the step 55, address data is written into the new address buffer in accordance with the result analyzed at the step 54. Then, the operation returns to the step 53 to check whether one frame of the input data has been ended.

Figure 10:
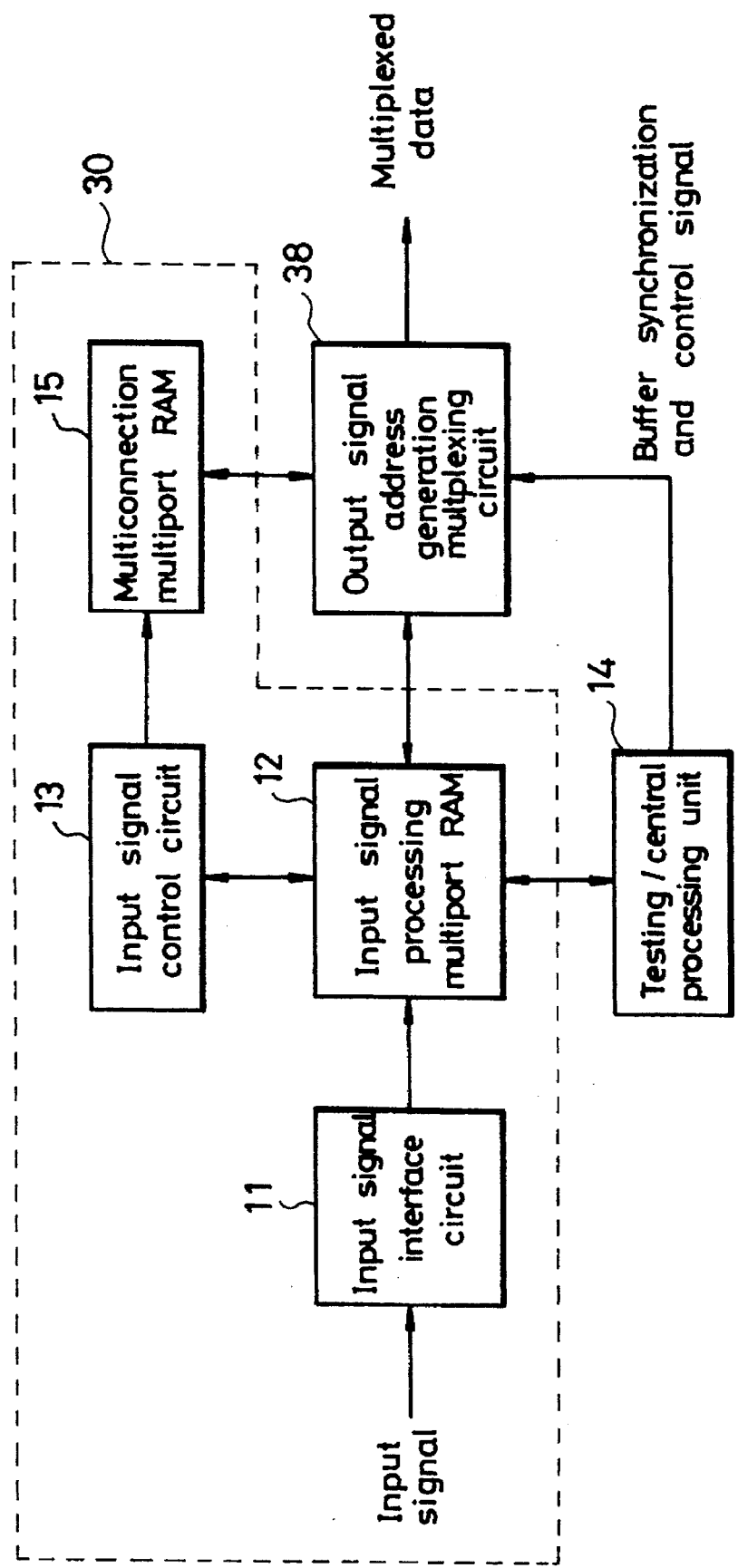
FIG. 10 is a block diagram of a signal multiplexing apparatus in accordance with an alternative embodiment of the present invention.

Referring to FIG. 10, there is shown a block diagram of a signal multiplexing apparatus in accordance with an alternative embodiment of the present invention. As shown in this drawing, the signal multiplexing apparatus comprises an input signal processing circuit 30 for multiplexing asynchronous input signals received by the input signal interface circuit 11. To this end, the input signal processing circuit 30 includes the input signal interface circuit 11, the input signal control circuit 13, the input signal processing multiport RAM 12 and the multiconnection multiport RAM 15.

Figure 11:
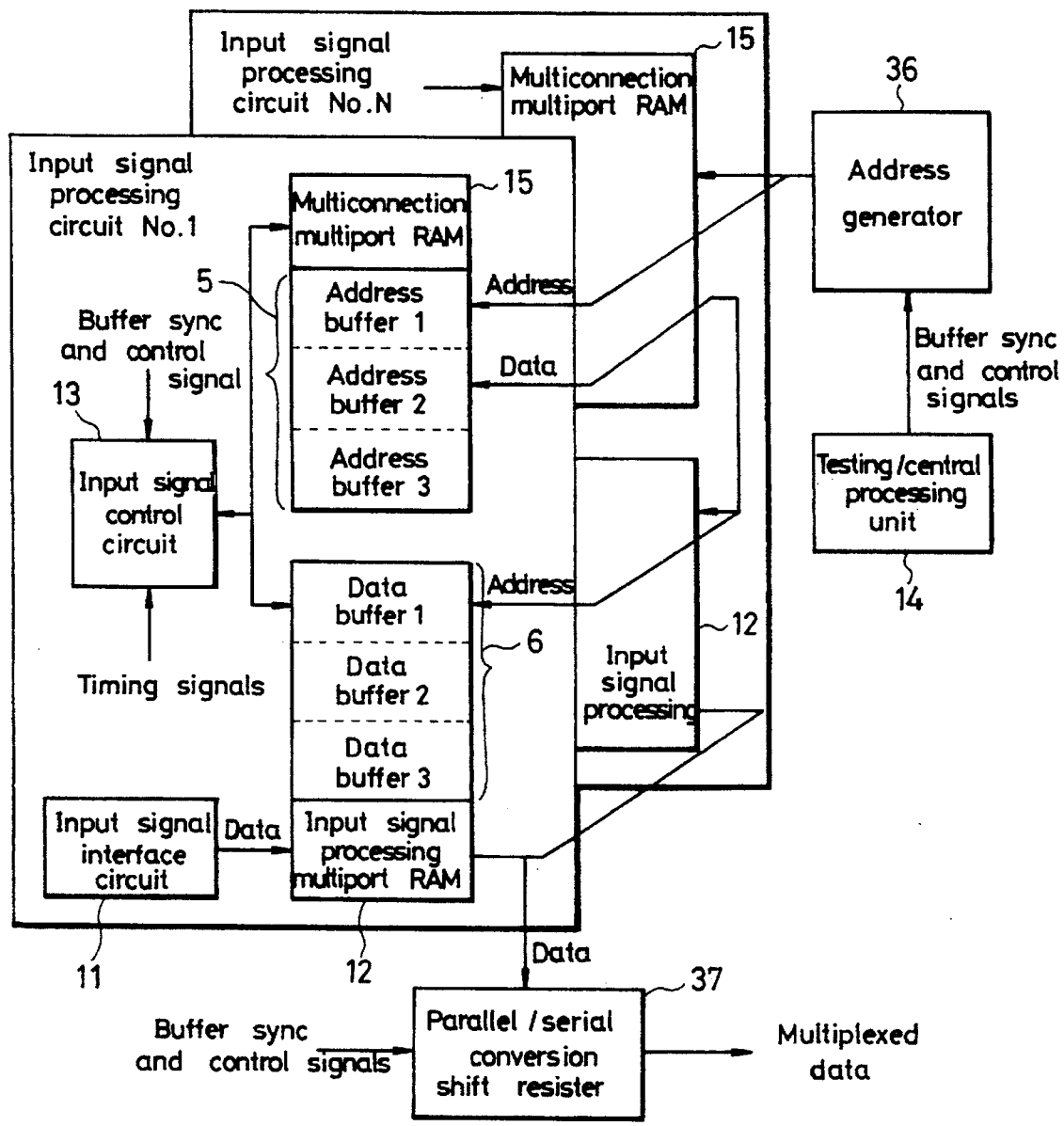
FIG. 11 is a detailed block diagram of an input signal processing circuit in FIG. 10.

Referring to FIG. 11, there is shown a detailed block diagram of the input signal processing circuit 30 in FIG. 10. As shown in this drawing, N input signal processing circuits 30 are connected to the output signal address generator 36 and the parallel/serial conversion shift register 37 in the output signal address generation/multiplexing circuit 38. In each of the N input signal processing circuits 30, the address data corresponding to the locations of the input signal processing multiport RAM 12 are stored into themulticonnection multiport RAM 15. The multiconnection multiport RAM 15 includes three address buffers 5 and the input signal processing multiport RAM 12 includes three data buffers 6. The address and data buffers 5 and 6 are cyclically used in the order of buffer 1→buffer 2→buffer 3→buffer 1→buffer 2→. . . .

In each of the N input signal processing circuits 30, the address buffer 5 and the data buffer 6 of the same number are simultaneously used in response to the buffer synchronization signal from the testing/central processing unit 14. The input signal control circuit 13 stores the present input signal into one just before the data buffer 5 designated by the output signal address generator 36.

The operation of the signal multiplexing apparatus with the above-mentioned construction in accordance with the alternative embodiment of the present invention will hereinafter be described in detail.

At the initial state, the testing/central processing unit 14 generates the buffer synchronization and control signals and supplies the generated buffer synchronization and control signals to the output signal address generation/multiplexing circuit 38 and the input signal control circuit 13. In response to the buffer synchronization and control signals from the testing/central processing unit 14, the input signal control circuit 13 assigns a desired one of the data buffers in the input signal processing multiport RAM 12 and a desired one of the address buffers in the multiconnection multiport RAM 15. Synchronously with the buffer synchronization signal from the testing/central processing unit 14, the assigned data buffer in the input signal processing multiport RAM 12 stores the input data and the assigned address buffer in the multiconnection multiport RAM 15 stores the address data corresponding to the input data.

In the input signal interface circuit 11, the serial input interface unit 21 generates the timing signals including the clock signal, the data synchronous signal and the frame synchronous signal and applies the generated timing signals to the input signal address generator 16 which supplies the addresses to the input signal processing multiport RAM 12. The serial input interface unit 21 also applies the generated timing signals to the serial/parallel conversion shift register 22 which supplies the data to the input signal processing multiport RAM 12. The serial input interface unit 21 further applies the generated timing signals to the input signal control circuit 13. In response to the timing signals from the serial input interface unit 21, the input signal control circuit 13 can store the input data into the input signal processing multiport RAM 12 without any error and accurately designate the data buffer in the input signal processing multiport RAM 12 and the address buffer in the multiconnection multiport RAM 15.

The input signal control circuit 13 recognizes the end of one frame of the input data in response to the timing signals from the serial input interface unit 21. Upon recognizing the end of one frame of the input data, the input signal control circuit 13 assigns a new data buffer and analyzes the received data. In accordance with the analyzed result, the input signal control circuit 13 stores the address data corresponding to the input data into the address buffer in the multiconnection multiport RAM 15 on the basis of the multiplexing order. At this time, the data and address buffers are synchronized with each other in response to the buffer synchronization and control signals from the testing/central processing unit 14.

Alternatively, each of the N input signal processing circuits 30 may include the input signal interface circuit 11, the input signal control circuit 13 and the input signal processing multiport RAM 12, except the multiconnection multiport RAM 15. In this case, the input signal processing circuit 30 is connected to the multiconnection multiport RAM 15 and the output signal address generation/multiplexing circuit 38.

The output signal address generator 36 in the output signal address generation/multiplexing circuit 38 generates addresses in response to the buffer synchronization and control signals from the testing/central processing unit 14 and applies the generated address to the multiconnection multiport RAM 15. The multiconnection multiport RAM 15 outputs address data stored in its locations corresponding to the addresses from the output signal address generator 36 to the input signal processing multiport RAM 12. As a result, the input signal processing multiport RAM 12 outputs parallel data stored in its locations corresponding to the address data from the multiconnection multiport RAM 15 to the parallel/serial conversion shift register 37 in the output signal address generation/multiplexing circuit 38. Here, the multiconnection multiport RAM 15 may not be included in each of the N input signal processing circuits 30, but connected in common to the N input signal processing circuits 30.

As a result, the data from the N input signal processing multiport RAMs 12 are supplied to the parallel/serial conversion shift register 37 and then multiplexed in response to the buffer synchronization and control signals from the testing/central processing unit 14.

As apparent from the above description, according to the present invention, the address storage memory locations can be changed according to the various signal input cases, and there is no necessity for taking a full synchronization between the input signals. Also, positions of time slots in the input signals can be changed in the process of multiplexing the input signals into the desired format. Further, the input signals are processed in a parallel manner so that the input signals and the corresponding addresses can be stored in a multiconnection manner. The use of the multiconnection manner has the effect of readily multiplexing the input signals with different characteristics into the desired format and making extension and maintenance easy. Therefore, according to the present invention, the input signals can be multiplexed even when they have different characteristics or formats, or when they are not synchronized with one another.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A signal multiplexing apparatus using multiconnection, comprising:

input signal interface means for inputting a DS1 or DS1E signal, a video signal and an ATM cell signal;

input signal processing multiport memory means connected to testing/central processing means;

input signal control means connected to said input signal processing multiport memory means, said input signal control means including a microprocessor and peripheral devices to operate in response to timing signals from said input signal interface means and buffer synchronization and control signals from said testing/central processing means, said peripheral devices including a read only memory, a random access memory, a timer and an interrupt control circuit, said timing signals including a clock signal, a data synchronous signal and a frame synchronous signal; and output signal address generation/multiplexing means responsive to the buffer synchronization and control signals from said testing/central processing means, for reading data from said input signal processing multiport memory means and multiplexing the read data into a desired format, said output signal address generation/multiplexing means generating address and applying the generated addresses to multiconnection multiport memory means.

2. A signal multiplexing apparatus using multiconnection, as set forth in claim 1, wherein said input signal interface means includes:

a serial input interface unit for inputting the DS1 or DS1E signal, the video signal and the ATM cell signal and generating the timing signals in response to the input signals;

an input signal address generator for generating addresses; and a serial/parallel conversion shift register responsive to a control signal from said serial input interface unit, for converting serial data from said serial input interface unit into parallel data and supplying the converted parallel data to said input signal processing multiport memory means.

3. A signal multiplexing apparatus using multiconnection, as set forth in claim 2, wherein said input signal address generator generates the addresses in response to the timing signals from said serial input interface unit and applies the generated addresses to said input signal processing multiport memory means.

4. A signal multiplexing apparatus using multiconnection, as set forth in claim 2, wherein said serial/parallel conversion shift register stores the parallel data into locations of said input signal processing multiport memory means corresponding to the addresses from said input signal address generator.

5. A signal multiplexing apparatus using multiconnection, as set forth in claim 1, wherein said input signal control means is programed to perform the steps of:

initializing said input signal control means;

assigning an initial data buffer and an initial address buffer in response to buffer initialization and synchronization signals;

storing input data into said initial data buffer;

checking whether one frame of the input data has been ended;

assigning a new data buffer and a new address buffer if it is checked that one frame of the input data has been ended, storing the input data into said new data buffer and analyzing the input data stored in said new data buffer;

writing address data into said new address buffer in accordance with the analyzed result; and returning to said step of checking whether one frame of the input data has been ended.

6. A signal multiplexing apparatus using multiconnection, as set forth in claim 1, wherein said input signal control means includes a microcomputer, said microcomputer having a microprocessor and peripheral devices, said peripheral devices including a read only memory, a random access memory, a timer and an interrupt control circuit.

7. A signal multiplexing apparatus using multiconnection, as set forth in claim 1, wherein said input signal control means stores address data corresponding to locations of said input signal processing multiport memory means into said multiconnection multiport memory means to control the multiplexing order.

8. A signal multiplexing apparatus using multiconnection, as set forth in claim 1, wherein said output signal address generation/multiplexing means includes;

an output signal address generator for generating the addresses in response to the buffer synchronization and control signals from said testing/central processing means and applying the generated addresses to said multiconnection multiport memory means; and a parallel/serial conversion shift register for converting the data from said input signal processing multiport memory means into serial data in response to the buffer synchronization and control signals from said testing/central processing means.

9. A signal multiplexing apparatus using multiconnection, as set forth in claim 1, wherein said multiconnection multiport memory means outputs address data stored in its locations corresponding to the addresses from said output signal address generation/multiplexing means to said input signal processing multiport memory means, said input signal processing multiport memory means outputting data stored in its locations corresponding to the address data from said multiconnection multiport memory means.

10. A signal multiplexing apparatus using multiconnection as set forth in claim 1, wherein said output signal address generation/multiplexing means includes a parallel/serial conversion shift register for multiplexing the data from said input signal processing multiport memory means into the desired format in response to the buffer synchronization and control signals from said testing/central processing means.

11. A signal multiplexing apparatus using multiconnection, as set forth in claim 1, further comprising:

a plurality of input signal processing means connected in parallel to said output signal address generation/multiplexing means, each of said plurality of input signal processing means including said input signal interface means, said input signal control means, said input signal processing multiport memory means and said multiconnection multiport memory means.

12. A signal multiplexing apparatus using multiconnection, as set forth in claim 1, further comprising:

a plurality of input signal processing means connected in parallel to said multiconnection multiport memory means and said output signal address generation/multiplexing means, each of said plurality of input signal processing means including said input signal interface means, said input signal control means and said input signal processing multiport memory means.

13. A signal multiplexing apparatus using multiconnection, as set forth in claim 1, wherein said multiconnection multiport memory means includes a plurality of address buffers and said input signal processing multiport memory means includes a plurality of data buffers.

14. A signal multiplexing apparatus using multiconnection, comprising:

input signal interface means for inputting a DS1 or DS1E signal, a video signal and an ATM cell signal;

input signal processing multiport memory means having a plurality of ports for receiving data from said input signal interface means;

input signal control means for controlling said input signal processing multiport memory means;

output signal address generation/multiplexing means connected to said input signal processing multiport memory means, said output signal address generation/multiplexing means reading data from said input signal processing multiport memory means and multiplexing the read data into a desired format;

multiconnection multiport memory means for performing an interface operation between said output signal address generation/multiplexing means and said input signal control means; and testing/central processing means connected to said input signal processing multiport memory means, for performing a test function and a system management function.

15. A signal multiplexing apparatus using multiconnection, as set forth in claim 11, wherein said multiconnection multiport memory means includes a plurality of address buffers and said input signal processing multiport memory means includes a plurality of data buffers.

16. A signal multiplexing apparatus using multiconnection, as set forth in claim 12, wherein said multiconnection multiport memory means includes a plurality of address buffers and said input signal processing multiport memory means includes a plurality of data buffers.

* * * * *